United States Patent
Teragawa

(10) Patent No.: US 7,982,819 B2
(45) Date of Patent: Jul. 19, 2011

(54) LIGHTING DEVICE FOR DISPLAY DEVICE AND DISPLAY DEVICE

(75) Inventor: Daisuke Teragawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 219 days.

(21) Appl. No.: 12/518,492

(22) PCT Filed: Jun. 29, 2007

(86) PCT No.: PCT/JP2007/063114
§ 371 (c)(1),
(2), (4) Date: Jun. 10, 2009

(87) PCT Pub. No.: WO2008/075476
PCT Pub. Date: Jun. 26, 2008

(65) Prior Publication Data
US 2010/0014020 A1    Jan. 21, 2010

(30) Foreign Application Priority Data
Dec. 20, 2006  (JP) ................................ 2006-342744

(51) Int. Cl.
G02F 1/1335   (2006.01)
(52) U.S. Cl. ................ 349/61; 349/56; 349/62; 349/67; 349/68
(58) Field of Classification Search ............. 349/56, 349/61, 62, 67, 68
See application file for complete search history.

(56) References Cited

U.S. PATENT DOCUMENTS

| 6,822,705 B2 * | 11/2004 | Shimoda et al. ............... 349/62 |
| 7,771,104 B2 * | 8/2010 | Iwasaki ......................... 362/628 |
| 7,784,958 B2 * | 8/2010 | Nakagome ................... 362/97.2 |
| 2009/0268433 A1 * | 10/2009 | Kusano ........................ 362/97.1 |

FOREIGN PATENT DOCUMENTS

| JP | 8-179318 | 7/1996 |
| JP | 2005-347062 | 12/2005 |
| JP | 2006-215475 | 8/2006 |

OTHER PUBLICATIONS

International Search Report for PCT/JP2007/063114, mailed Aug. 14, 2007.

* cited by examiner

*Primary Examiner* — Jennifer Doan
(74) *Attorney, Agent, or Firm* — Nixon & Vanderhye, P.C.

(57) ABSTRACT

A lighting device for a display device, according to the present invention, includes a plurality of tubular light sources 17 arranged parallel to one another, and a light reflecting plate 14 arranged on the side of the tubular light sources 17 that corresponds to the opposite side of the light emitting side. The tubular light sources 17 on an inner side of the array are arranged at narrower intervals, than those on an outer side of the array. A plurality of angled reflective portions 40 are provided on the light reflecting plate 14, so that each of the angled reflective portions is positioned between adjacent tubular light sources 17 and extends along the longitudinal direction of the tubular light sources 17. Each angled reflective portion 40 includes two inclined surfaces 41, 42, which face the adjacent tubular light sources 17, respectively. The two inclined surfaces 41, 42 can reflect a larger amount of light to the outer side of a center position O between the adjacent tubular light sources 17 that corresponds to the outer side of the array, than to the inner side of the array.

17 Claims, 10 Drawing Sheets

LIGHTING DEVICE FOR DISPLAY DEVICE AND DISPLAY DEVICE

This application is the U.S. national phase of International Application No. PCT/JP2007/063114 filed 29 Jun. 2007, which designated the U.S. and claims priority to Japan Application No. 2006-342744 filed 20 Dec. 2006, the entire contents of each of which are hereby incorporated by reference.

TECHNICAL FIELD

The present invention relates to a lighting device for a display device and a display device using the same.

BACKGROUND ART

In a display device having non-luminous optical elements as typified by a liquid crystal display device, a backlight device is provided on the backside of a display panel such as a liquid crystal panel, so as to illuminate the display panel (as shown in Patent Document 1, for example).
Patent Document 1: JP-A-2005-347062

DISCLOSURE OF THE INVENTION

Problem to be Solved by the Invention

Patent Document 1 discloses a technique for enhancing the central brightness of a display screen while compensating brightness reduction in the peripheral areas of the display screen in order to maintain brightness uniformity of the display screen. Specifically, a plurality of fluorescent lamps are arranged so that the intervals therebetween are narrower at the central area corresponding to the central area of the display screen of a display panel, than at the peripheral areas corresponding to the peripheral areas of the display screen (which is also referred to as an unequal lamp-pitch structure). Further, the distances between a diffuser plate and the plurality of fluorescent lamps are set to be larger at the central area than at the peripheral areas, in order to achieve brightness uniformity of the display screen as well as enhancement of the central brightness of the display screen. As additional means for compensating the unevenness of brightness particularly at the peripheral areas of the display screen, reflectors having angle sections are provided integrally on the bottom surface of a reflecting plate, or specifically, in the areas prone to the unevenness of brightness, and are arranged along the longitudinal direction of the fluorescent lamps.

However, even in the case of using the above technique, the outer tubular light source of adjacent tubular light sources is more prone to shortage of brightness in comparison with the other tubular light source, because the plurality of reflectors are equivalently positioned relative to the tubular light sources and the angled shapes thereof are equivalently formed so that lights reflected by the reflectors are equivalently oriented. That is, in the unequal lamp-pitch structure, a large amount of light from a large number of tubular light sources is applied to the inner side of each reflector, while a small amount of light from a smaller number of tubular light sources is applied to the outer side of the reflector. This may be particularly prominent in the outer-side areas of the array of tubular light sources (i.e., in the peripheral areas of the display screen), and may cause display unevenness resulting in reduction of display quality.

The present invention was made in view of the foregoing circumstances, and an object thereof is to provide a lighting device for a display device, which includes a simple construction for enhancing its central brightness and reducing unevenness of brightness at its peripheral areas so as to be capable of inexpensively enhancing the central brightness of a display screen and preventing or suppressing display unevenness at the peripheral areas of the display screen. A further object of the present invention is to provide a display device capable of providing high-quality images using the above lighting device for the display device.

Means for Solving the Problem

In order to solve the above problem, the present invention provides a lighting device for a display device, which includes a plurality of tubular light sources arranged parallel to one another, and further includes a light reflecting plate arranged on the side of the tubular light sources that corresponds to the opposite side of the light emitting side. The tubular light sources are arranged so that a narrow-interval area where the arrangement interval of the tubular light sources is relatively narrow and a wide-interval area where the arrangement interval is relatively wide are provided. A plurality of angled reflective portions are provided on the light reflecting plate, so that each of the angled reflective portions is positioned between adjacent tubular light sources of the above tubular light sources. Each of the angled reflective portions extends along the longitudinal direction of the tubular light sources, and includes two inclined surfaces which face adjacent tubular light sources, respectively. The two inclined surfaces are arranged to reflect a larger amount of light to the side of the center position between the adjacent tubular light sources that corresponds to the wide-interval area side of the tubular light sources, than to the narrow-interval area side of the tubular light sources.

In the lighting device for a display device having the above construction, the arrangement interval of the tubular light sources varies so that an area where the interval is relatively narrow and an area where the interval is relatively wide are provided. Thereby, the illumination brightness can be higher at the wide-interval area side than at the narrow-interval area side. Further, the provision of the wide-interval area may result in cost reduction due to the relatively wide interval, compared to including a larger number of tubular light sources. Note that a display device may have to provide a bright display at its inner side (or at its central area) but it does not need to provide a brighter display at its outer side (or at its peripheral area). Therefore, preferably, the narrow-interval area may be provided at the inner side (or central area) of a display device, while the wide-interval area may be provided at the outer side (or peripheral area) of the display device.

In the case of a construction thus having variation in arrangement interval, the wide-interval area where the arrangement interval is wide includes the brightness difference of illumination light between an area including a tubular light source and an interval area between adjacent tubular light sources (i.e., an area including no tubular light source), which may cause a display device using the present lighting device to include a visible boundary between light and dark, resulting in display unevenness. That is, the amount of light applied to a reflector by a large number of tubular light sources included in the narrow-interval area can be larger while the amount of light applied to the reflector by a smaller number of tubular light sources included in the wide-interval area can be small. The resultant difference of the amount of reflected light causes the above problem.

In view of the above, the present invention provides elongated angled reflective portions between the tubular light sources, as well as the above construction having variation in arrangement of the array. Each angled reflective portion includes two inclined surfaces facing adjacent tubular light sources, respectively, so that the two inclined surfaces can reflect a larger amount of light to the side of the center position between the adjacent tubular light sources that corresponds to the wide-interval area side of the tubular light sources, than to the narrow-interval area side.

The light amount at the side of the center position between adjacent tubular light sources that corresponds to the wide-interval area side is thus increased, and thereby the illumination brightness at the wide-interval area side can be enhanced. Consequently, the brightness reduction in illumination light from the wide-interval area side, described above, can be prevented or suppressed. Therefore, a display device using the present lighting device may be prevented from including a visible boundary between light and dark. Thus, display unevenness can be prevented or suppressed.

Some aspects of the present invention provide variations of arrangement intervals of the tubular light sources. For example, the tubular light sources may be arranged so that the arrangement interval of she tubular light sources is narrower at an inner side of the array than at an outer side of the array.

The narrow-interval area may be positioned in a central area of the array of the tubular light sources, while the wide-interval area may be positioned in an end area of the array of the tubular light sources.

Alternatively, the narrow-interval area may be provided at a position that is shifted from a central area of the array of the tubular light sources to an end area side of the array.

The tubular light sources may be arranged so that areas between the center of the array of the tubular light sources and respective end sides thereof include the same number of tubular light sources, respectively.

Alternatively, the tubular light sources may be arranged so that areas between the center of the array of the tubular light sources and respective end sides thereof include different numbers of tubular light sources from each other.

Further aspects of the present invention will be hereinafter explained, pointing to the case where the narrow-interval area is positioned at a central area (or an inner side) of the array of the tubular light sources while the wide-interval area is positioned at an end area (or an outer side) of the array of the tubular light sources, as an example. However, the present invention is not limited to the following aspects.

In the lighting device for a display device, according to the present invention, an angled reflective portion of the above angled reflective portions may be arranged between adjacent tubular light sources of the tubular light sources so that the apex of the angled reflective portion is shifted from the center position between the adjacent tubular light sources to the side of a tubular light source of the adjacent tubular light sources that is positioned on the outer side of the array of the tubular light sources.

The present construction enables the two inclined surfaces to reflect a larger amount of light to the outer side of the center position between the adjacent tubular light sources or to the outer side of the array of the tubular light sources, than to the inner side of the array of the tubular light sources. That is, the shifting of the apex of the angled reflective portion to the outer side from the center position between the adjacent tubular light sources causes the reflected light to be shifted to the outer side, resulting in increase of the light amount reflected to the outer side. Consequently, the brightness reduction in illumination flight from the outer side of the array can be prevented or suppressed, as described above. Therefore, a display device using the present lighting device may be prevented from including a visible boundary between light and dark. Thus, display unevenness can be prevented or suppressed.

In the lighting device for a display device, according to the present invention, an angled reflective portion of the angled reflective portions may be arranged between adjacent tubular light sources of the tubular light sources, so that the apex of the angled reflective portion is positioned at the center position between the adjacent tubular light sources while, as for the two inclined surfaces of the angled reflective portion, a first inclined surface thereof that faces the inner side of the array of the tubular light sources forms an inclination angle smaller than the inclination angle of a second inclined surface that faces the outer side of the array of the tubular light sources.

The present construction enables the two inclined surfaces to reflect a larger amount of light to the outer side of the center position between the adjacent tubular light sources or to the outer side of the array of the tubular light sources, than to the inner side of the array of the tubular light sources. That is, on the angled reflective portion thus arranged with its apex at the center position between adjacent tubular light sources, the first inclined surface of the two inclined surfaces that faces the inner side of the array forms an inclination angle smaller than the inclination angle of the second inclined surface that faces the outer side of the array, and therefore the first inclined surface facing the inner side slopes relatively gradually. Accordingly, the reflected light is prone to being shifted from the inner side to the outer side, resulting in increase of the light amount reflected to the outer side. Consequently, the brightness reduction in illumination light from the outer side of the array can be prevented or suppressed, as described above. Therefore, a display device using the present lighting device may be prevented from including a visible boundary between light and dark. Thus, display unevenness can be prevented or suppressed.

In the lighting device for a display device, according to the present invention, an angled reflective portion of the angled reflective portions may be arranged between adjacent tubular light sources of the tubular light sources, so that the apex of the angled reflective portion is shifted from the center position between the adjacent tubular light sources to the side of a tubular light source of the adjacent tubular light sources that is positioned on the outer side of the array of the tubular light sources while, as for the two inclined surfaces of the angled reflective portion, a first inclined surface thereof that faces the inner side of the array of the tubular light sources forms an inclination angle smaller than the inclination angle of a second inclined surface thereof that faces the outer side of the array of the tubular light sources.

The present construction enables the two inclined surfaces to reflect a larger amount of light to the outer side of the center position between the adjacent tubular light sources or to the outer side of the array of the tubular light sources, than to the inner side of the array of the tubular light sources. That is, the shifting of the apex of the angled reflective portion to the outer side from the center position between the adjacent tubular light sources causes the reflected light to be shifted to the outer side, resulting in increase of the light amount reflected to the outer side. Further, the first inclined surface of the two inclined surfaces that faces the inner side of the array forms an inclination angle smaller than the inclination angle of the second inclined surface that faces the outer side of the array, and therefore the first inclined surface facing the inner side slopes relatively gradually. Accordingly, the reflected light is prone to being shifted from the inner side to outer side, resulting in increase of the light amount reflected to the outer side. Consequently, the brightness reduction in illumination light from the outer side of the array can be prevented or suppressed, as described above. Therefore, a display device using the present lighting device may be prevented from including a visible boundary between light and dark. Thus, display unevenness can be prevented or suppressed.

The apexes of the angled reflective portions may be shifted from the center positions so that the shift amount of a first angled reflective portion positioned on the outer side of the array of the tubular light sources is larger than the shift amount of a second angled reflective portion positioned on the inner side of the array of the tubular light sources.

When the angled reflective portions are thus constructed so that the shift amounts of the apexes of the angled reflective portions differ among angled reflective portions, or specifically, the shift amount of the first angled reflective portion on the outer side is set to be larger, the first angled reflective portion on the outer side can reflect a larger amount of light to the outer side, than the other angled reflective portions. Thereby, the unevenness of illumination light from the outer side of the array of the tubular light sources (i.e., from the area corresponding to the peripheral area of the display screen) can be reduced. Thus, display unevenness can be prevented or suppressed.

The angled reflective portions may be constructed so that the areas of the two inclined surfaces are larger at a first angled reflective portion positioned on the outer side of the array of the tubular light sources, than at a second angled reflective portion positioned on the inner side of the array of the tubular light sources.

The outer-side first angled reflective portion thus having relatively large areas of the inclined surfaces can orient a large amount of light by its inclinations when reflecting it. Consequently, the light from the outer side of the array can be adequately dispersed while being reflected, even if the tubular light sources on the outer side of the array are arranged at relatively large intervals as in the present invention. Thereby, the unevenness of illumination light from the outer side of the array (i.e., from the area corresponding to the peripheral area of the display screen) can be reduced. Thus, display unevenness can be prevented or suppressed.

The angled reflective portions can be arranged parallel to one another so as to be positioned between the tubular light sources.

The angled reflective portions thus arranged parallel and positioned between the tubular light sources can effectively reflect light from the tubular light sources. Further, unevenness of brightness can be prevented or suppressed at all of areas between the tubular light sources.

The parallel-arranged angled reflective portions may be shaped to be symmetric with respect to the center position of the array thereof.

The angled reflective portions thus shaped to be symmetric with respect to the center position of the array enable the brightness of illumination light to be distributed symmetrically with respect to the center position of the array over the areas on the both sides. Consequently, the generation of a defect, such as brightness difference between the right and left areas or between the upper and lower areas of the display screen, can be prevented or suppressed.

The angled reflective portions can be arranged at all of respective areas between the tubular light sources.

The angled reflective portions thus arranged at all of areas between the tubular light sources can effectively reflect every light from the tubular light sources. Consequently, display unevenness can be prevented or suppressed over the entire display screen.

The tubular light sources can be arranged in a plane area parallel to a planar surface of the light reflecting plate.

The above advantages of the angled reflective portions are particularly prominent when the tubular light sources are thus arranged in a plane area parallel to the planar surface of the light reflecting plate. That is, when the tubular light sources are arranged so as not to be parallel to the planar surface of the light reflecting plate, the angled reflective portions having the above constructions may fail to orient the light toward the outer side of the array while reflecting it. In contrast, when the tubular light sources are arranged in one plane area parallel to the planar surface of the light reflecting plate, the advantages that the angled reflective portions orient the light toward the outer side while reflecting it can be achieved prominently and infallibly.

The tubular light sources can be arranged in a plane area parallel to the light emitting surface.

In this case, the advantages that the angled reflective portions orient the light toward the outer side while reflecting it can be also achieved more prominently and infallibly, compared to arranging the tubular light sources in a plane area that is not parallel to the light emitting surface. Further, a light diffuser plate may be arranged on the side of the light emitting surface, and the tubular light sources can be arranged in a plane area parallel to a planar surface of the light diffuser plate. In this case, the diffused light with reduced unevenness of brightness can be provided as illumination light for a display device. Thus, a higher quality lighting device can be achieved.

The heights of the angled reflective portions above the light reflecting plate may be set so that a first angled reflective portion has a larger height than the height of a second angled reflective portion that is positioned closer to the inner side of the array of the tubular light sources than the first angled reflective portion.

The larger height of the first angled reflective portion thus arranged on the outer side of the array facilitates provision of the inclined surfaces of the angled reflective portion having large areas. Further, due to the smaller height of the inner-side second angled reflective portion, the light reflected by the outer-side angled reflective portion can be prevented from being reflected by the inner-side second angled reflective portion.

The light reflecting plate can include a reflective metallic plate member provided on a base member made of synthetic resin, and the angled reflective portions may be formed by bending the reflective metallic plate member.

According to the construction, the angled reflective portions can be readily and infallibly formed on the light reflecting plate.

The reflective metallic plate member may have a construction in which a reflective coating film is formed on a metallic plate member.

In this case, workability and light reflectivity can be independently and suitably designed, which enables provision of a lighting device for a display device that meets a number of requirements.

Alternatively, the light reflecting plate can include a reflective synthetic-resin plate member, and the angled reflective portions may be formed by bending the reflective synthetic-resin plate member.

Alternatively, the light reflecting plate can include a reflective synthetic-resin plate member provided on a base member made of synthetic resin, and the angled reflective portions may be formed by bending the base member and attaching the reflective synthetic-resin member to and along the shaped base member.

Further alternatively, the light reflecting plate can include a reflective synthetic-resin plate member provided on a base member made of synthetic resin, and the angled reflective portions may be formed by bending the reflective synthetic-resin plate member.

Further alternatively, the light reflecting plate can include a reflective synthetic-resin plate member provided on a base member made of metal, and the angled reflective portions may be formed by bending the reflective synthetic-resin plate member.

Further alternatively, the light reflecting plate can include a reflective synthetic-resin plate member provided on a base member made of metal, and the angled reflective portions may be formed by bending the base member and the reflective synthetic-resin plate member.

According to the above aspects, the angled reflective portions can be adequately formed on the light reflecting plate.

In order to solve the above problem, a display device according to the present invention includes a lighting device for a display device described above, and a display panel for providing display by use of light from the lighting device for a display device.

According to the construction, the display device can have enhanced central brightness of the display screen. Thus, a bright display at the central area can be achieved inexpensively by a simple construction. Further, the unevenness of brightness at the peripheral area of the display screen can be prevented or suppressed, so that the generation of a defect, such as visible streaky unevenness (or lamp streak) attributable to the tubular light sources, can be prevented or suppressed. Thus, the extremely high quality of display can be achieved.

A liquid crystal panel can exemplify the above display panel. The display device as a liquid crystal display device has a variety of applications, such as a television display or a personal-computer display. Particularly, it is suitable for a large-screen display.

Effect of the Invention

A lighting device for a display device, according to the present invention, is capable of inexpensively enhancing the central brightness of a display screen using a simple construction, and further is capable of preventing or suppressing display unevenness at the peripheral areas of the display screen. A display device according to the present invention can provide display of high-quality images with enhanced brightness and with reduced display unevenness.

EXPLANATION OF SYMBOLS

10: Liquid crystal display device (Display device), 11: Liquid crystal panel (Display panel), 12: Backlight device (Lighting device for a display device), 14: Base (Light reflecting plate), 17: Cold cathode tube (Tubular light source), 40: Angled reflective portion, 40a: First angled reflective portion, 40b: Second angled reflective portion, 41: Inclined surface (First inclined surface), 42: Inclined surface (Second inclined surface), $\theta(\theta 1, \theta 2)$: Inclination angle, O: Center position between adjacent tubular light sources.

BEST MODE FOR CARRYING OUT THE INVENTION

An embodiment of the present invention will be hereinafter explained with reference to the drawings.

Figure 1:
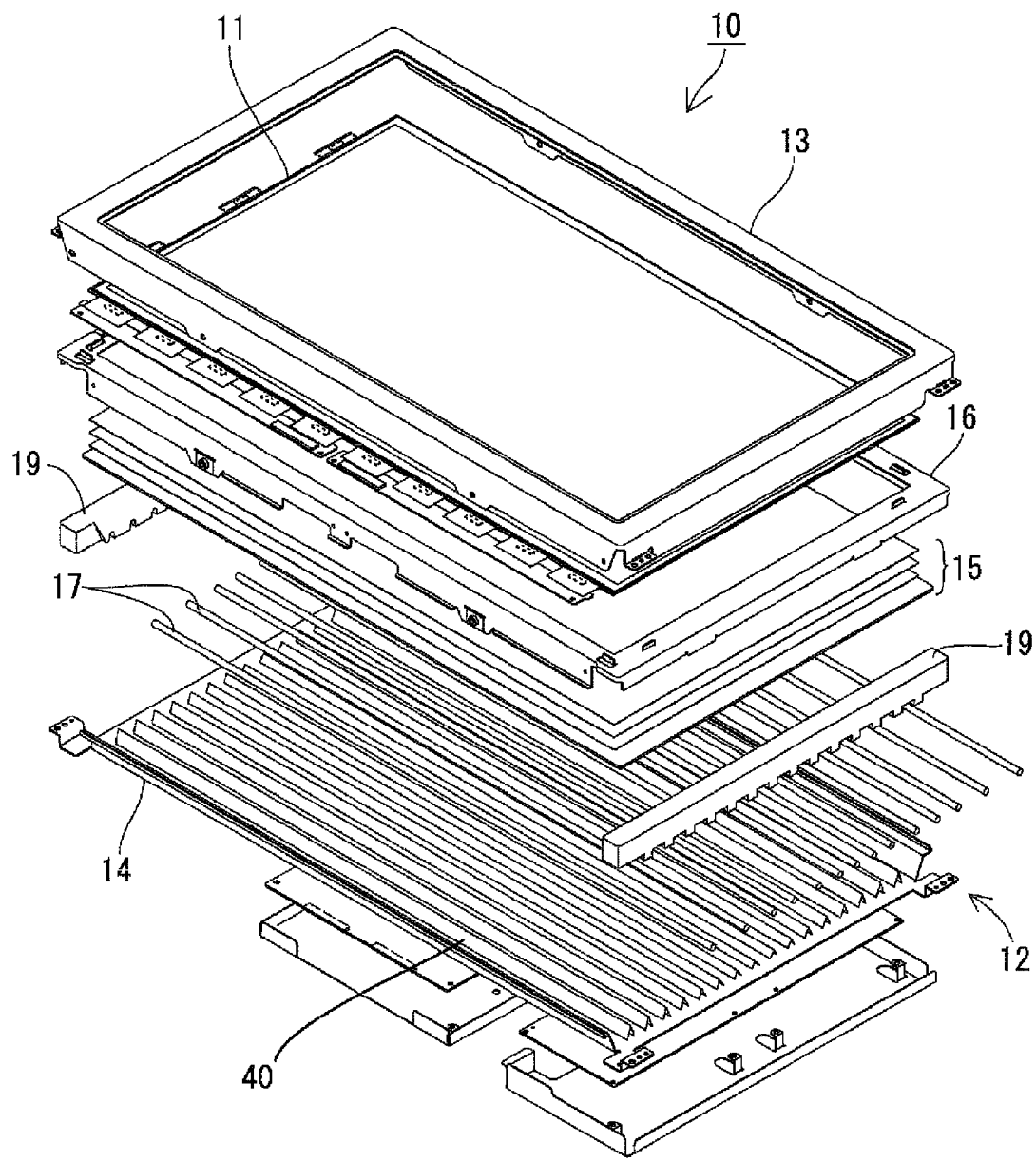
FIG. 1 is an exploded perspective view showing the general construction of a liquid crystal display device according to an embodiment of the present invention.
Figure 2:
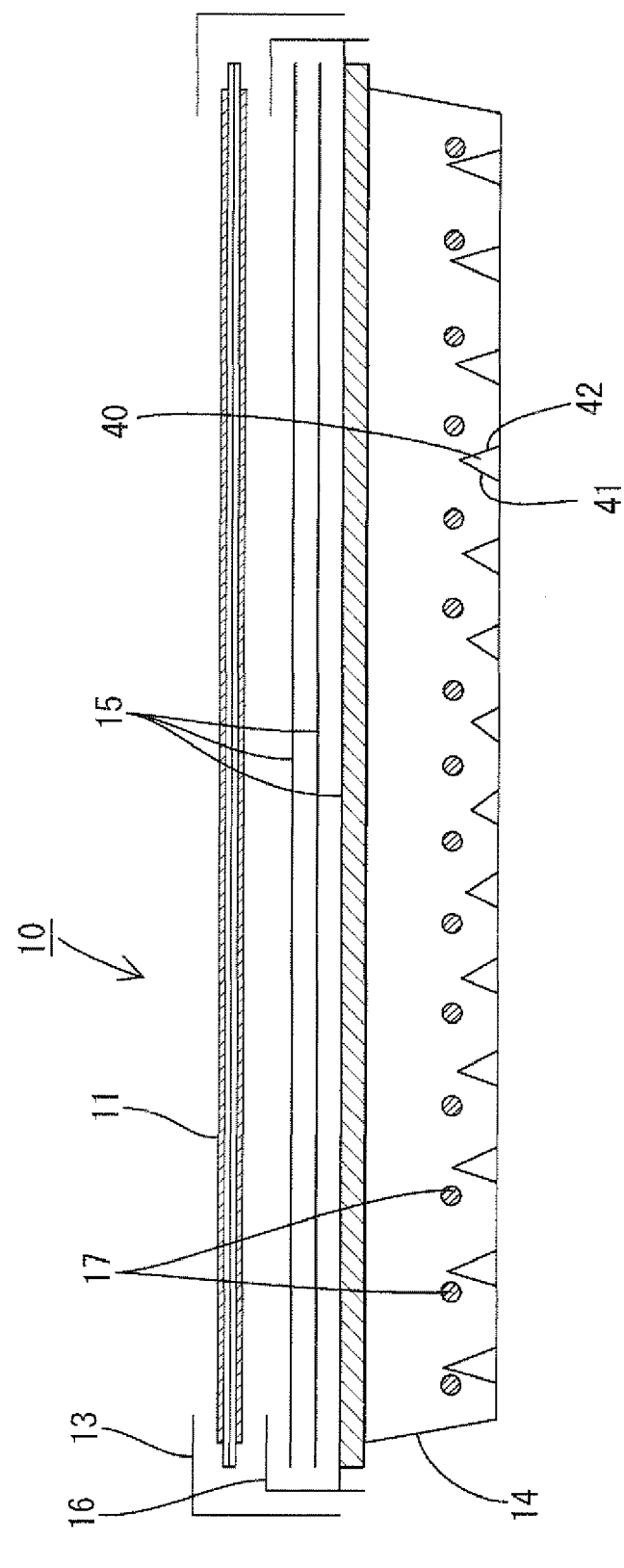
FIG. 2 is a sectional view of the liquid crystal display device shown in FIG. 1.
Figure 3:
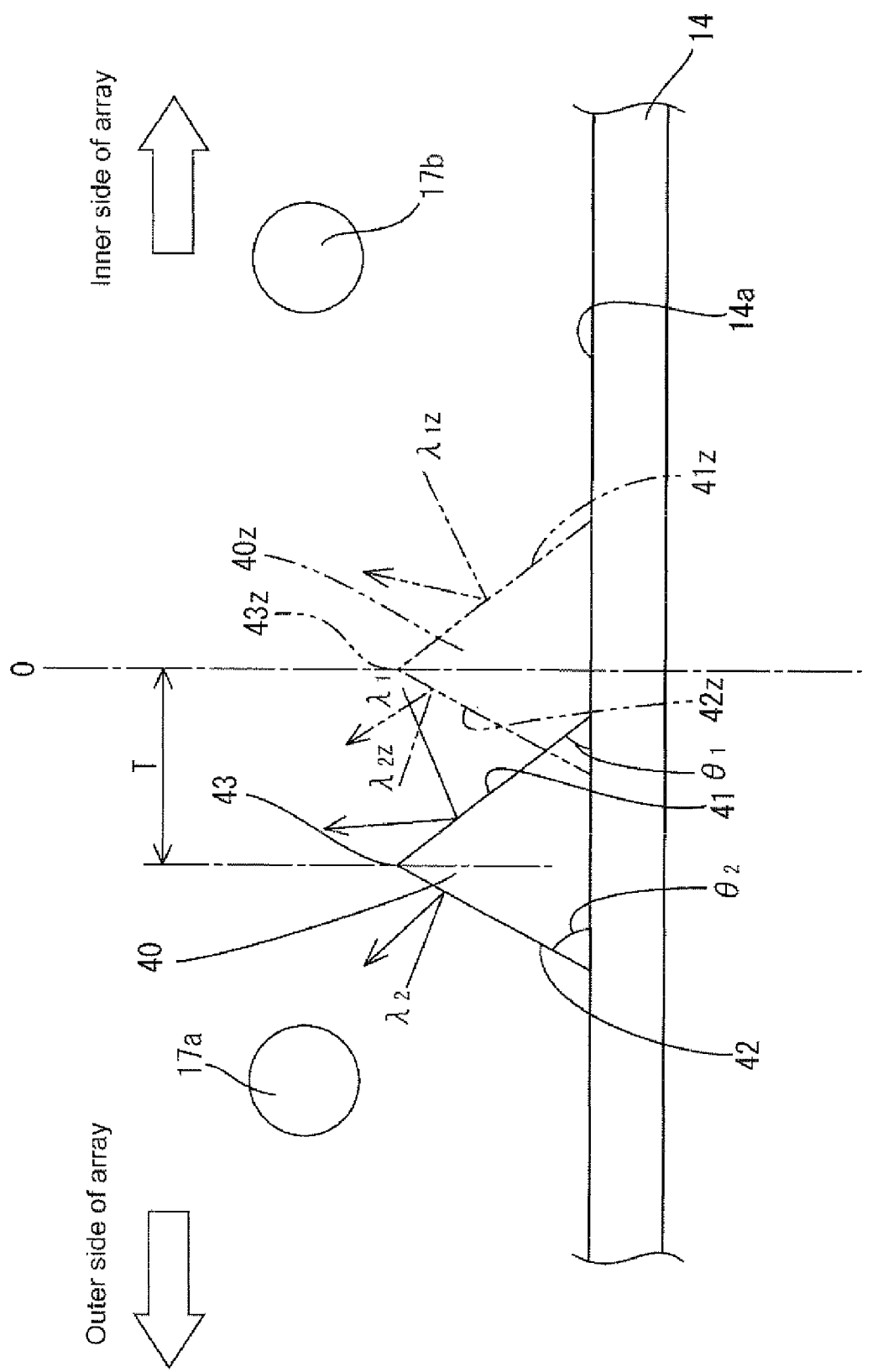
FIG. 3 is an explanatory diagram showing the construction and operational effects of a characteristic part of a backlight device.
Figure 4:
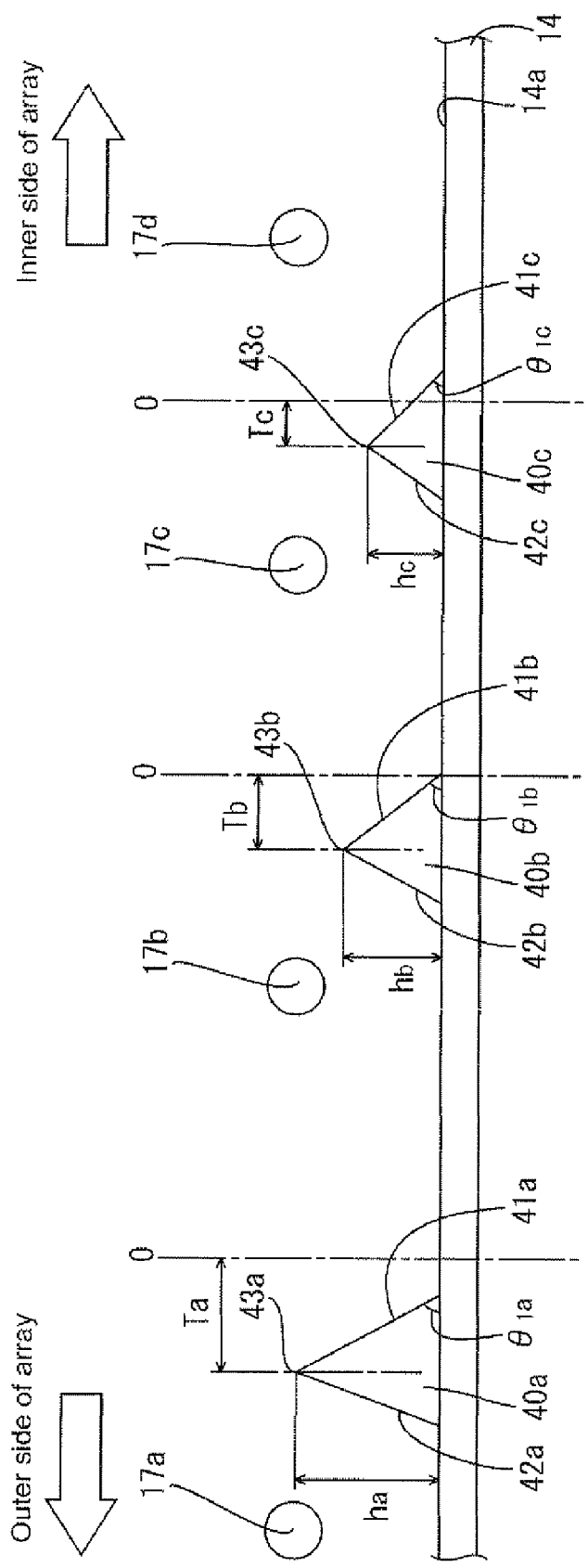
FIG. 4 is an explanatory diagram showing the detailed construction of a characteristic part of the backlight device.
Figure 5:
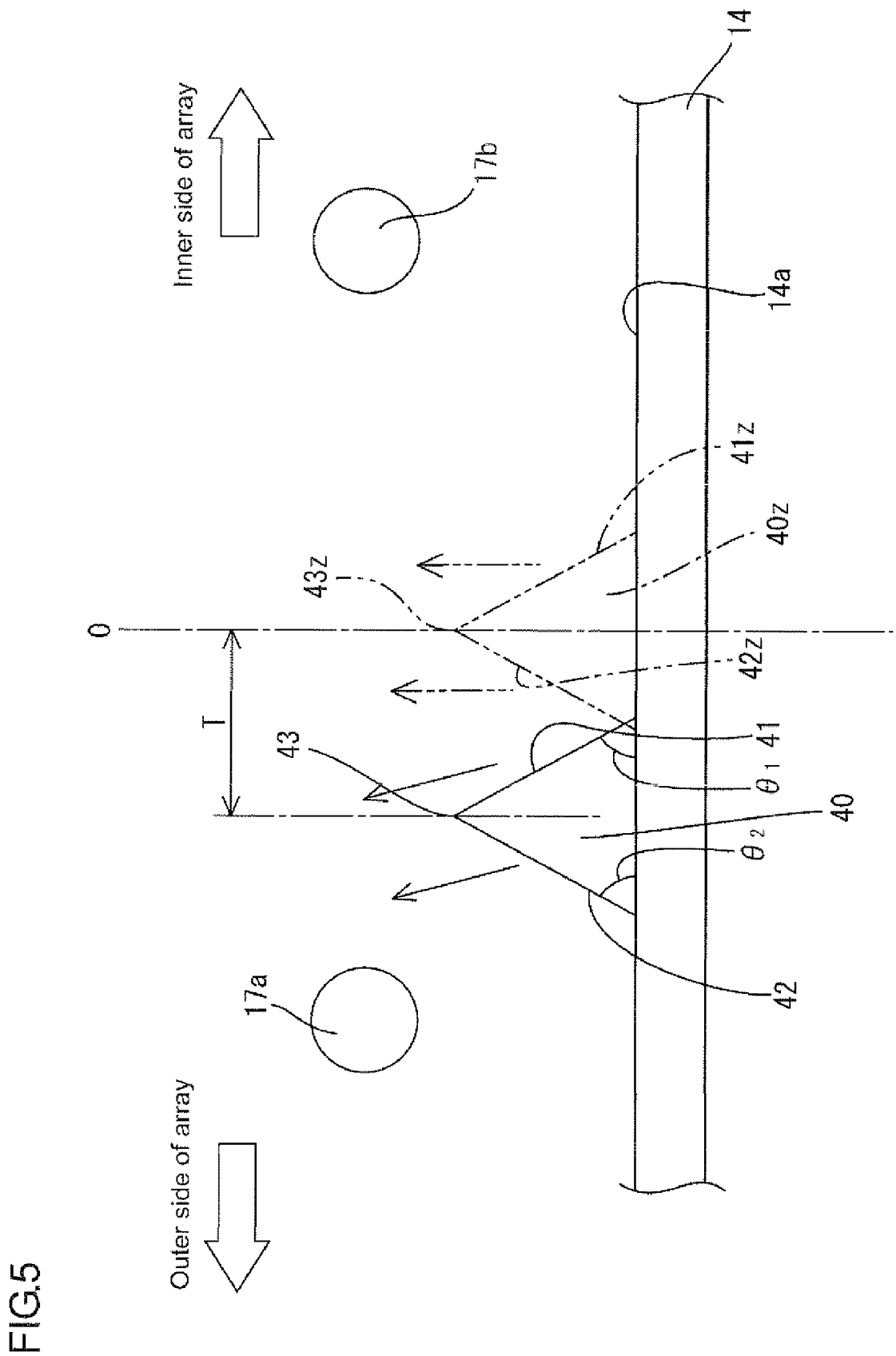
FIG. 5 is an explanatory diagram showing the construction and operational effects of a characteristic part of a modification of the backlight device.
Figure 6:
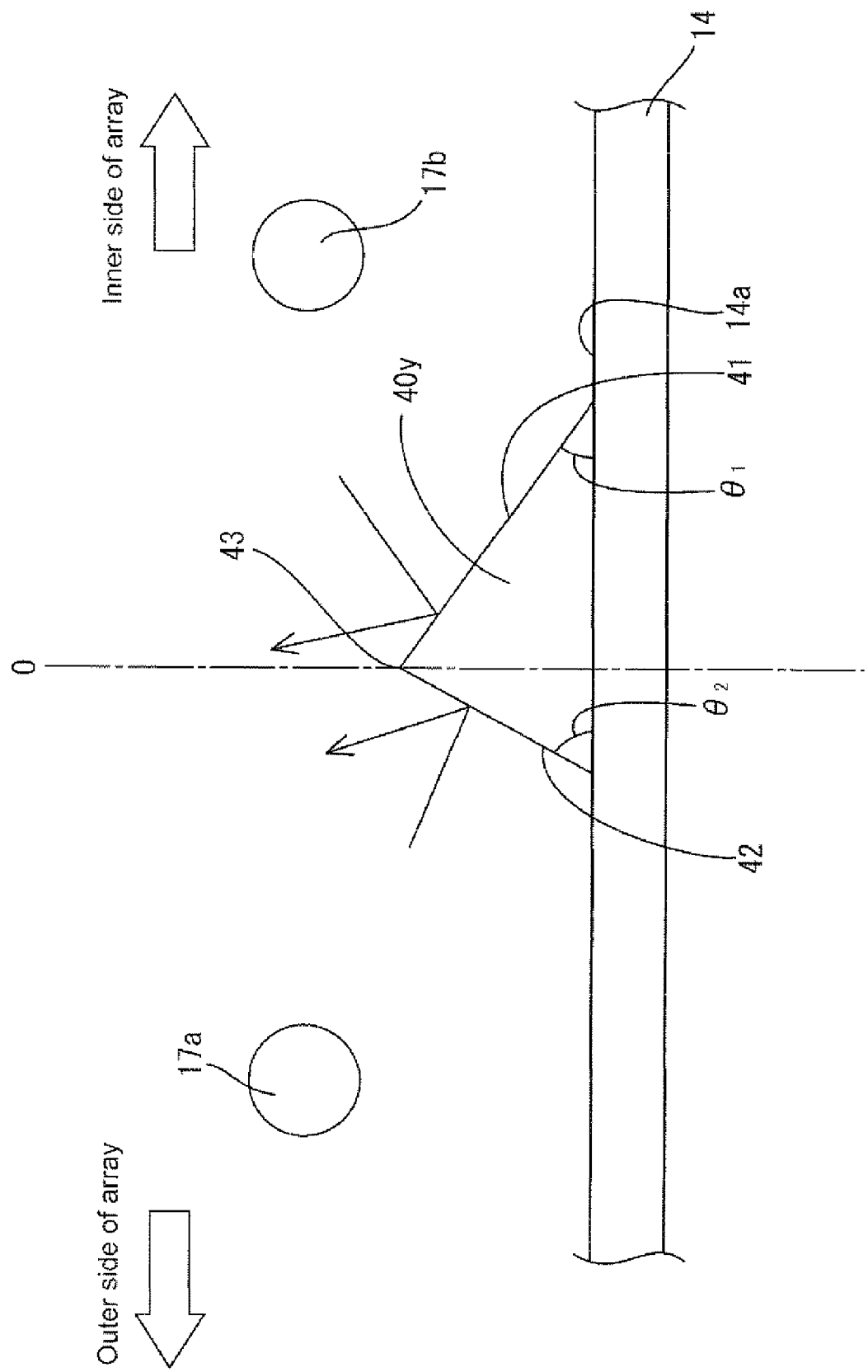
FIG. 6 is an explanatory diagram showing the construction and operational effects of a characteristic part of another modification of the backlight device.
Figure 7:
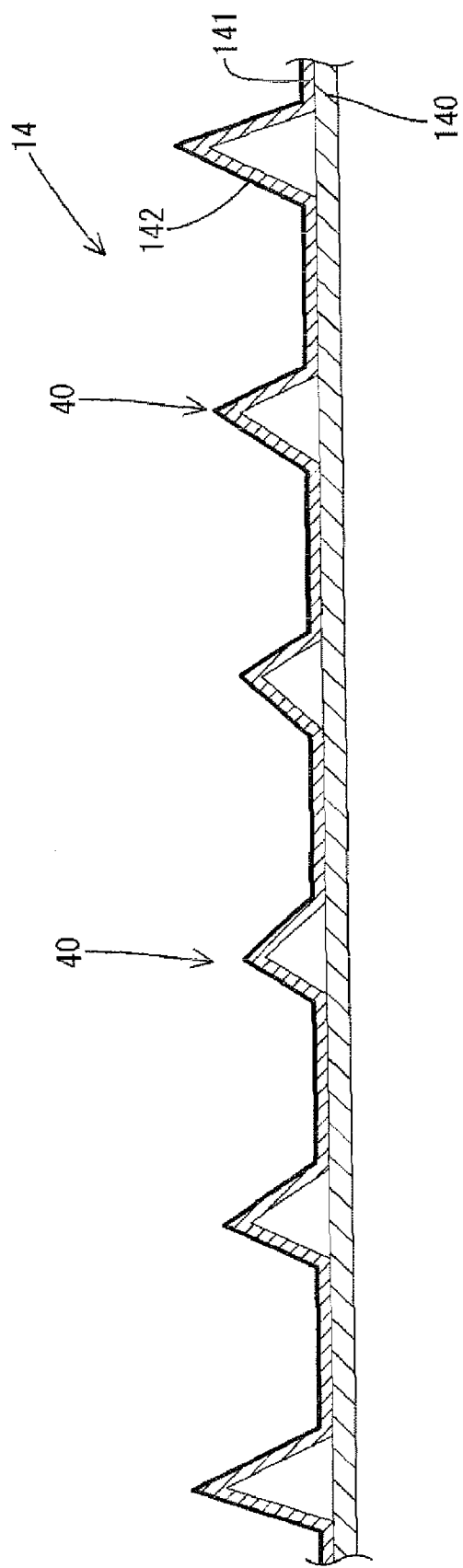
FIG. 7 is a sectional view schematically showing the construction of a base (or light reflecting plate) of the backlight device.
Figure 8:
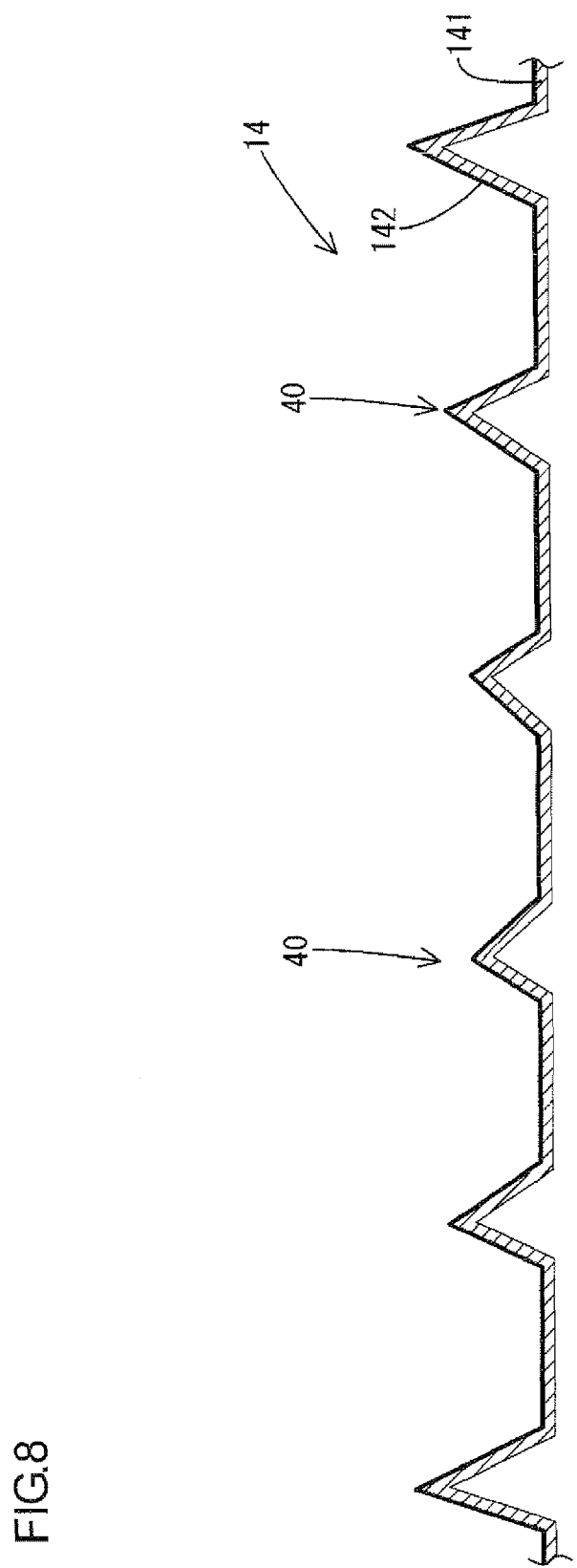
FIG. 8 is a sectional view schematically showing a modification of the base (or light reflecting plate) of the backlight device.

FIG. 1 is an exploded perspective view showing the general construction of a liquid crystal display device according to the embodiment of the present invention FIG. 2 is a sectional view also showing the general construction of the liquid crystal display device. FIG. 3 is an explanatory diagram showing the construction and operational effects of a characteristic part of a backlight device included in the liquid crystal display device of the present embodiment. FIG. 4 is an explanatory diagram showing the detailed construction of a characteristic part of the backlight device. FIG. 5 is an explanatory diagram showing the construction and operational effects of a characteristic part of a modification of the backlight device. FIG. 6 is an explanatory diagram showing the construction and operational effects of a characteristic part of another modification of the backlight device. FIG. 7 is a sectional view schematically showing the construction of abase (or light reflecting plate) of the backlight device. FIG. 8 is a sectional view schematically showing a modification of the base (or light reflecting plate) of the backlight device.

The general construction of the liquid crystal display device (display device) 10 will be explained first. Referring to FIGS. 1 and 2, the liquid crystal display device 10 includes a liquid crystal panel 11 having a rectangular shape, and a backlight device 12 as an external light source, which are integrally held by a bezel 13 and the like. The liquid crystal panel 11 includes a pair of glass substrates, which are attached to each other so as to face each other while a gap of a predetermined size is kept therebetween. Liquid crystal is disposed between the glass substrates. Switching elements (e.g., TFTs) connected to a source wiring line and a gate wiring line running at right angles to each other, and pixel electrodes connected to the switching elements are provided on one of the glass substrates. A counter electrode, a color filter formed of R, G, and B color sections, and the like, are provided on the other of the glass substrates.

Next, the backlight device 12 will be explained. The backlight device 12 is a so-called direct-light type backlight device that includes light sources (e.g., cold cathode tubes 17, in the present embodiment), which are positioned directly below the back surface of the liquid crystal panel 11 (i.e., the panel surface on the opposite side of the display side), and are arranged parallel to one another and along the panel surface.

The backlight device 12 includes a metallic base (or light reflecting plate) 14 having a substantially box-like shape with an opening on its upper side, and a plurality of optical members 15 (e.g., a diffuser plate, a diffusing sheet, a lens sheet and an optical sheet, in order from the lower side of the figure) which are arranged to cover in the opening of the base 14. Further included are a frame 76 arranged to hold the optical members 15 on the base 14, cold cathode tubes (or tubular light sources) 17 as lamps contained in the base 14, and lamp holders 19 arranged to cover and lump the cold cathode tubes 17 together. Note that the optical member 15 side of the cold cathode tubes 17 corresponds to the light emitting side of the backlight device 12.

The substantially box-like base 14 has a construction shown in FIG. 7, in which sheet metal 141 is attached to a plate-like base member 140 made of synthetic resin or metallic material. A reflective synthetic-resin coating film 142 is formed on the surface of the sheet metal 141, so that the sheet metal 141 and the reflective synthetic-resin coating film 142 together form a reflective metallic plate member. The base (or light reflecting plate) 14 thus includes a light reflecting surface 14a formed of the reflective synthetic-resin coating film 142, and thereby the light from the cold cathode tubes 17 can be reflected to the optical members 15 such as the diffuser plate (hereinafter, sometimes referred to as "the diffuser plate 15 and the like"). Alternatively, the base member 140 may be eliminated from the base 14, as shown in FIG. 8. That is, it can be constructed to have sheet metal 141 formed into the shape and a reflective synthetic-resin coating film 142 formed thereon.

Each of the cold cathode tubes 17 forms a tubular shape elongated in one direction. A number (e.g., eighteen in FIG. 1) of cold cathode tubes 17 are arranged parallel to one another (so as to form an array), and are contained in the base 14 so that the longitudinal direction (or axial direction) thereof conforms with the longitudinal direction of the base 14. Specifically, the cold cathode tubes 17 are arranged so that the array direction thereof is parallel to the light reflecting surface 14a of the base 14 and also parallel to the planar surface (or light emitting surface) 15a of the optical member 15 such as the diffuser plate. Further, each cold cathode tube 17 is arranged parallel to the light reflecting surface 14a of the base 14 and also parallel to the planar surface 15a of the optical member 15. That is, the cold cathode tubes 17 are arranged parallel in a plane area that is parallel to the planar surface of the base 14, or specifically, of the base member 140. The plane area where the cold cathode tubes 17 are arranged is also parallel to the light emitting surface (or, to the planar surface 15a of the optical member 15).

Further, ion the present construction, the arrangement intervals between the cold cathode tubes 17 differ depending on the positions along the array direction thereof. Specifically, the arrangement intervals are set to be narrower at the inner side of the array of the cold cathode tubes 17 (i.e., at the central area of the backlight device 20 (or, at the central area of the display screen of the liquid crystal display device 10)), than at the outer sides of the array (i.e., at the peripheral areas of the backlight device 20 (or, at the peripheral areas of the display screen of the liquid crystal display device 10)). That is, the cold cathode tubes 17 are densely arranged at the inner side of the array, while the cold cathode tubes 17 are sparsely arranged at the outer sides of the array. Thereby, the backlight device 12 can apply illumination light with relatively high brightness to the central area (of the display screen) of the display panel 11.

In the present embodiment, angled reflective portions 40 are formed on the base 14, so as to be positioned in all of respective areas between adjacent cold cathode tubes 17 and 17. As shown in FIG. 2 and the like, each of the angled reflective portions 40 includes two inclined surfaces 41, 42, which form light reflecting surfaces. The inclined surfaces 41, 42 are arranged in lines in the areas between cold cathode tubes 17 and 17, so as to form a striped configuration formed of strips along the longitudinal direction of the cold cathode tubes 17. In the present embodiment, referring to FIGS. 4 and 5, the base 14 having angled reflective portions 40 can be provided by forming the reflective synthetic-resin coating film 141 on the surface of the sheet metal 141 partly formed (or bent) into angled shapes and mounting the resultant structure on the base member 140. In the present embodiment, the constructions of the parallel-arranged angled reflective portions 40 differ depending on the arrangement positions, and the details thereof are as follows.

Referring to FIG. 3, each of the angled reflective portions 40 is positioned between adjacent cold cathode tubes 17a, 17b, so that the apex 43 thereof is shifted to the outer cold cathode tube 17a side by an amount T from the center position O between the cold cathode tubes 17a, 17b. That is, the angled reflective portion 40 is arranged nearer to the outer cold cathode tube 17a of the adjacent cold cathode tubes 17a, 17b.

Referring to FIG. 4, the shift amounts T of the apexes 43 of angled reflective portions 40 shifted from the center positions O are set to be larger at the angled reflective portion on the outer side of the array of the cold cathode tubes 17. That is, the shift amount T is increased step by step from the angled reflective portion 40c on the inner side of the array of the cold cathode tubes 17 to the angled reflective portion 40a on the outer side. Specifically, the shift amount Ta of the first angled reflective portion 40a on the outer (or peripheral) side of the array of the cold cathode tubes 17 is set to be larger than the shift amount Tb or Tc of the second angled reflective portion 40b or 40c on the inner (or center) side of the array of the cold cathode tubes 17. That is, "Ta>Tb>Tc" is true in FIG. 4.

Further, referring to FIG. 3, as for two inclined surfaces 41, 42 of each angled reflective portion 40, the inclination angle θ1 of the first inclined surface 41 facing the inner side of the array of the cold cathode tubes 17 is set to be smaller than the inclination angle θ2 of the second inclined surface 42 facing the outer side of the array. That is, two inclined surfaces 41, 42 of each angled reflective portion 40 are constructed so that the inclined surface 41 on the inner (or center) side slopes relatively gradually.

Further, referring to FIG. 4, the areas of two inclined surfaces 41, 42 of the angled reflective portions 40 are set to be larger at the first angled reflective portion 40a on the outer (or peripheral) side of the array, than at the second angled reflective portion 40b or 40c on the inner (or center) side of the array. That is, the areas of the inclined surfaces 41, 42 increase step by step from the angled reflective portion 40c on the inner side of the array of the cold cathode tubes 17 to the angled reflective portion 40a on the outer side. Specifically, the areas of the inclined surfaces 41a, 42a of the first angled reflective portion 40a on the outer (or peripheral) side of the array of the cold cathode tubes 17 is set to be larger than the areas of the inclined surfaces 41b, 42b (or 41c, 42c) of the second angled reflective portion 40b (or 40c) on the inner (or center) side of the array of the cold cathode tubes 17.

Moreover, the inclination angles of the first inclined surfaces 41 of the angled reflective portions 40 differ among angled reflective portions 40, as shown in FIG. 4. Specifically, the inclination angle θ1a of the first inclined surface 41a of the first angled reflective portion 40a on the outer side of the array of the cold cathode tubes 17 is set to be larger than the inclination angle θ2a of the first inclined surface 41b of the second angled reflective portion 40b that is arranged on the inner side of the first angled reflective portion 40a and on the inner side of the array of the cold cathode tubes 17. That is, "θ1a>θ1b>θ1c" is true in FIG. 4. Note that Inclination angles θ (i.e., θ1 (such as θ1a or θ1b) and θ2 (such as θ2a or θ2b)) mean angles of inclined surfaces 41, 42 with respect to the fundamental plane of the angled reflective portion 40 (i.e., with respect to the surface of the base member (or sheet metal 141) of the base 14), in the present embodiment.

As shown in FIG. 2, the angled reflective portions 40 are shaped to be symmetric with respect to the center line (or central axis) of the array of the parallel-arranged cold cathode tubes 17. Specifically, the inclination angles θ1, θ2 of the inclined surfaces 41, 42 are formed to be symmetric with respect to the center line (or central axis) of the array.

Further, the heights "h" of the angled reflective portions 40 above the base 14 (or specifically, above the base member 140) differ among angled reflective portions 40. Specifically, as shown in FIG. 4, the height "ha" of the first angled reflective portion 40a on the outer side of the array of the cold cathode tubes 17 is larger than the height "hb" of the second angled reflective portion 40b that is arranged on the inner side of the first angled reflective portion 40a and on the inner side of the array of the cold cathode tubes 17. That is, in FIG. 4, "ha>hb>hc" is true for heights ha, hb, hc of angled reflective portions 40a, 40b, 40c. Note that height "h" (such as "ha" or "hb") means the height of the apex of an angled reflective portion 40 above the fundamental plane of the angled reflective portion 40 (i.e., above the surface of the base member (or sheet metal 141) of the base 14), in the present embodiment.

The liquid crystal display device 10 of the present embodiment has the above construction, and the operational effects thereof will be explained next.

In the liquid crystal display device 10 of the present embodiment, the arrangement intervals of a plurality of cold cathode tubes 17, which are arranged parallel in the backlight device 12 when viewed from the top (or when viewed from the display screen side), are set to be narrower at the center side of the display screen and wider at the peripheral sides of the display screen. Thereby, the central brightness of the display screen can be enhanced, compared to the peripheral areas. Consequently, bright display can be achieved at the central area.

Further, the elongated angled reflective portions 40 are provided between the cold cathode tubes 17, so that the apex 43 of each angled reflective portion 40 is shifted from the center position O between adjacent cold cathode tubes 17a, 17b to the side of the cold cathode tube 17a located on the outer side of the array. According to the construction, the amount of light reflected by the two inclined surfaces 41, 42 can be larger at the outer side (or cold cathode tube 17a side) of the center position O between the adjacent cold cathode tubes 17a, 17b, than at the inner side (or cold cathode tube 17b side). That is, due to the shifting of the apex 43 of each angled reflective portion 40 to the outer side from the center position O between adjacent cold cathode tubes 17a, 17b, the reflected light can be shifted to the outer side, resulting in increase of the light amount reflected to the outer side.

Specifically, in the case that the apex 43z of an angled reflective portion 40z is located at the center position O as shown by dashed lines in FIG. 3, incident lights λ1z and λ2z are reflected substantially symmetrically, i.e., they are reflected in a balanced manner with respect to the center position O. In contrast, the apex 43 of the angled reflective portion 40 is shifted from the center position O by the amount T as shown by solid lines, and accordingly the incident lights λ1 and λ2 are reflected in a biased manner toward the outer cold cathode tube 17a side of the center position O, resulting in increase of the light amount reflected to the outer side. Consequently, the brightness reduction in illumination light from the outer side of the array can be prevented or suppressed. Therefore, in the liquid crystal display device 10 having the above backlight device 20, the peripheral areas of display corresponding to the outer sides of the array of the cold cathode tubes 17 may be prevented from including a visible boundary between light and dark. Thus, display unevenness can be prevented or suppressed.

Particularly, in the present embodiment, the shift amounts T of the apexes 43 of the angled reflective portions 40 differ among angled reflective portions, and specifically the shift amount of the first angled reflective portion 40a on the outer side is larger. Consequently, as for the amounts of lights reflected by the angled reflective portions 40, the first angled reflective portion 40a on the outer side can reflect a larger amount of light to the outer side. Thereby, the unevenness of illumination light from the outer sides of the array of the cold cathode tubes 17 (i.e., from the areas corresponding to the peripheral areas of the display screen) can be reduced. Thus, display unevenness can be prevented or suppressed.

As for the two inclined surfaces 41, 42 of each angled reflective portion 40, the inclination angle θ1 of the first inclined surface 41 facing the inner side of the array of the cold cathode tubes 17 is set to be smaller than the inclination angle θ2 of the second inclined surface 42 facing the outer side of the array of the cold cathode tubes 17. The first inclined surface 41 is thus constructed to slope relatively gradually, and thereby the two inclined surfaces 41, 42 can reflect a larger amount of light to the outer side of the array of the cold cathode tubes 17, than to the inner side of the array of the cold cathode tubes 17.

That is, the light reflected by the first inclined surface 41 that faces the inner side and slopes gradually is prone to being shifted from the inner side to the outer side, resulting in Increase of the light amount reflected to the outer side of the array. Consequently, the brightness reduction in illumination light from the outer side of the array can be prevented or suppressed. Therefore, in the liquid crystal display device 10 having the above backlight device 20, the peripheral areas of display corresponding to the outer sides of the array of the cold cathode tubes 17 may be prevented from including a visible boundary between light and dark. Thus, display unevenness can be prevented or suppressed.

Further, in the liquid crystal display device 10 of the present embodiment, the areas of the inclined surfaces 41, 42 of the angled reflective portions 40 are set to be relatively large at the first angled reflective portion 41 on the outer side, so that the first angled reflective portion 41 can orient a large amount of light by its inclinations when reflecting it. Consequently, the light from the outer side of the array can be adequately dispersed while being reflected, even if the cold cathode tubes 17 on the outer side of the array are arranged at relatively large intervals as in the backlight device 20 of the present embodiment. Thereby, the unevenness of illumination light from the outer sides of the array (i.e., from the areas corresponding to the peripheral areas of the display screen) can be reduced. Thus, display unevenness can be prevented or suppressed.

The base 14 is formed of a base member 140 and sheet metal 141 provided thereon, and the angled reflective portions 40 are formed by bending the sheet metal 141. Further, as described above, a reflective synthetic-resin coating film 142 as a light reflective coating film is formed on the surface of the sheet metal 141 so as to form a light reflecting surface. According to the construction, the angled reflective portions 40 can be readily and infallibly formed on the base 14. In the case of the construction thus including the reflective synthetic-resin coating film 142 formed on the sheet metal (or metallic plate member) 141, workability and light reflectivity can be independently and suitably designed, which enables provision of a backlight device 12 that meets a number of requirements.

Shown above is the embodiment of the present invention. However, the present invention is not limited to the embodiment explained in the above description made with reference to the drawings. The following embodiments may be included in the technical scope of the present invention, for example, and further the present invention may be embodied in various forms without departing from the scope of the invention.

In the above embodiment, the inclination angles θ1, θ2 of the inclined surfaces 41, 42 of each angled reflective portion 40 differ from each other. However, the inclined surfaces 41, 42 may be formed so that the inclination angles θ1, θ2 are the same as each other, as shown in FIG. 5, for example, as long as the angled reflective portion 40y is provided at a position shifted to the outer side of the array (i.e., to the cold cathode tube 17a side) from the center position O between adjacent cold cathode tubes 17a, 17b. In this case, the reflected lights can be also oriented toward the outer side of the array, resulting in increase of the light amount reflected to the outer side of the array.

Alternatively, an angled reflective portion 40 may be formed at the center position O between adjacent cold cathode tubes 17a, 17b as shown in FIG. 6, as long as the inclination angles θ1, θ2 of the inclined surfaces 41, 42 of the angled reflective portion 40 differ from each other. In this case, the reflected lights can be also oriented to the outer side of the array, resulting in increase of the light amount reflected to the outer side of the array.

In the above embodiment, cold cathode tubes 17 are used as tubular light sources. However, the present invention can include a construction in which another type of tubular light sources such as hot cathode tubes are used, for example. Further, holding members (or lamp clips) may be provided on the base 14 so as to restrict the arrangement positions of the cold cathode tubes 17.

In the embodiment, the angled reflective portions 40 are provided in all of respective areas between cold cathode tubes 17. However, the angled reflective portions 40 may be eliminated from the central area, for example. That is, the angled reflective portions 40 may be selectively provided in the peripheral areas. The central area does not necessarily need the angled reflective portions 40, because it is immune to streaky unevenness of brightness, particularly due to the dense arrangement of the cold cathode tubes 17. This construction can contribute to cost reduction.

Figure 9:
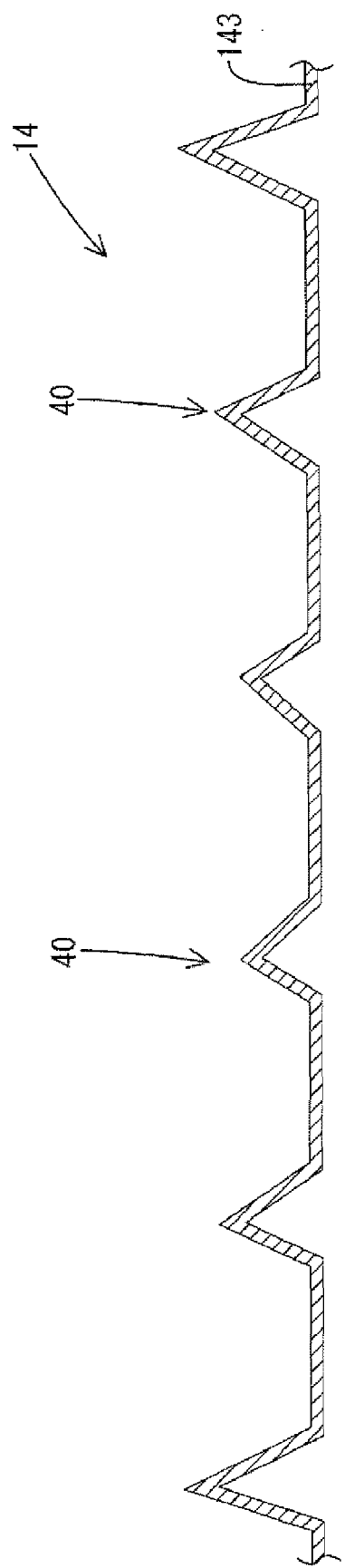
FIG. 9 is a sectional view schematically showing another modification of the base (or light reflecting plate) of the backlight device.

The light reflecting plate 14 may be formed of a reflective synthetic-resin plate member 143, as shown in FIG. 9. The angled reflective portions 40 can be formed by bending the reflective synthetic-resin plate member 143.

Alternatively, the light reflecting plate 14 may have a construction that includes a synthetic-resin base member, instead of sheet metal 141 shown in FIG. 8, and further includes a reflective synthetic-resin plate member provided on the base member 141. The angled reflective portions 40 can be formed by bending the base member 141 and attaching the reflective synthetic-resin member 142 to and along the shaped base member 141.

Figure 10:
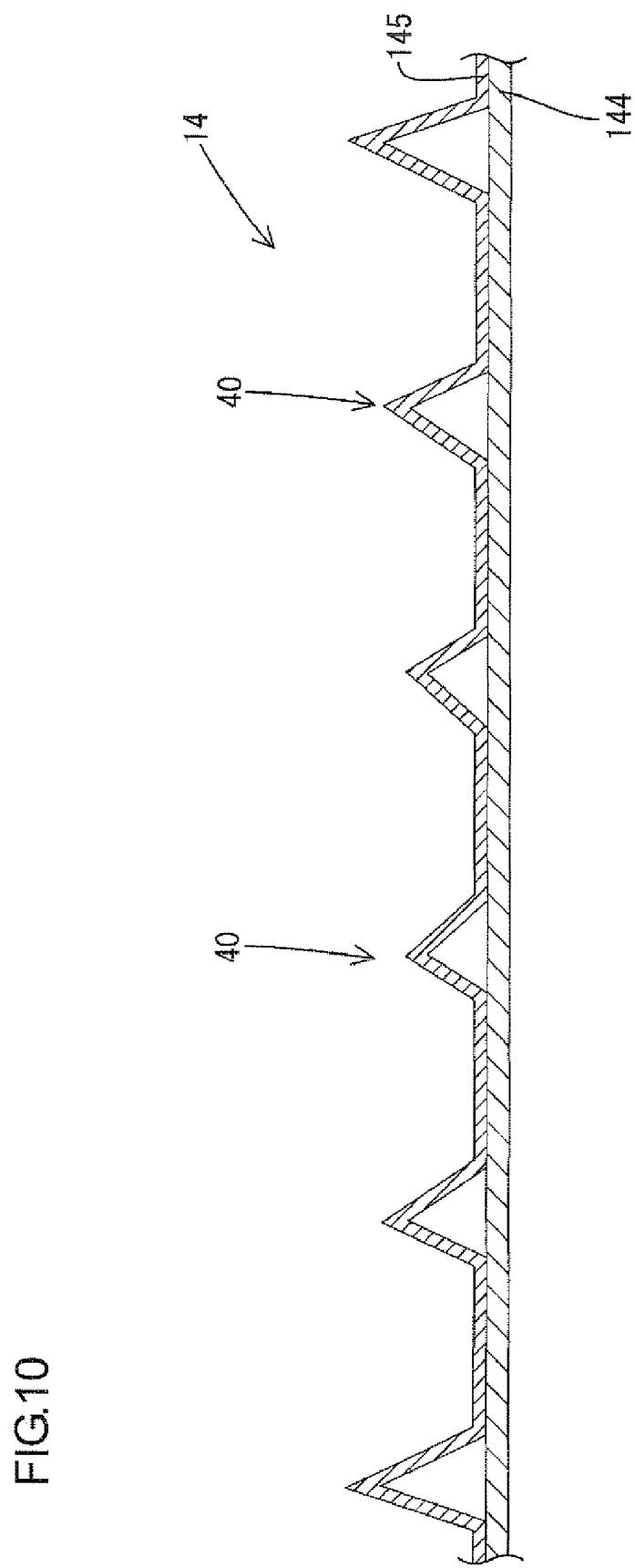
FIG. 10 is a sectional view schematically showing another modification of the base (or light reflecting plate) of the backlight device.

Alternatively, the light reflecting plate 14 may be formed of a synthetic-resin base member 144 and a reflective synthetic-resin plate member 145 provided thereon, as shown in FIG. 10. The angled reflective portions 40 can be formed by bending the reflective synthetic-resin plate member 145.

Further alternatively, the base member 144 shown in FIG. 10 may be made of metal. In this case, the reflective synthetic-resin plate member 145 can be also provided on the base member 144, and the angled reflective portions 40 can be formed by bending the reflective synthetic-resin plate member 145.

The present invention can be applied to a liquid crystal display device that uses another type of switching elements than TFTs. Further, the present invention can be applied to a liquid crystal display device for monochrome display, as well as a liquid crystal display device capable of color display. Moreover, although a liquid crystal display device is shown in the above embodiment, the present invention can be applied to other types of display devices than a liquid crystal type, which use a back light device.

The invention claimed is:

1. A lighting device for a display device, comprising:
   a plurality of linear light sources arranged parallel to one another so as to emit light to a light emitting side; and
   a light reflecting plate arranged on a back side of said plurality of linear light sources that corresponds to an opposite side of said light emitting side, wherein:
   at least one angled reflective portion having an angled section is provided on said light reflecting plate, so as to extend along a longitudinal direction of said plurality of linear light sources;
   said at least one angled reflective portion is positioned between a first linear light source and a second linear light source which are adjacently-arranged linear light sources of said plurality of linear light sources positioned at a first distance from each other;
   a third linear light source of said plurality linear light sources is arranged adjacent to and at a second distance from said first linear light source so as to be positioned across said first linear light source from said second linear light source, and said second distance is set to be smaller than said first distance;
   said at least one angled reflective portion includes a first inclined surface and a second inclined surface as light reflecting surfaces so that said first inclined surface faces said first linear light source while said second inclined surface faces said second linear light source; and
   said at least one angled reflective portion is arranged to reflect a larger amount of light to a side of said second linear light source, than to a side of said first linear light source.

2. A lighting device for a display device, as in claim 1, wherein:
   said second linear light source is positioned on an outer side of said first linear light source along an array direction of said plurality of linear light sources; and
   said third linear light source is positioned on an inner side of said first linear light source along the array direction of said plurality of linear light sources.

3. A lighting device for a display device, as in claim 1, wherein areas between a center of the array of said plurality of linear light sources and respective end sides of the array include a same number of linear light sources, respectively.

4. A lighting device for a display device, as in claim 1, wherein said at least one angled reflective portion is positioned between said first linear light source and said second linear light source so that an apex of said at least one angled reflective portion is shifted from a center position between said first linear light source and said second linear light source to a side of said second linear light source.

5. A lighting device for a display device, as in claim 4, wherein said first inclined surface of said at least one angled reflective portion forms an inclination angle smaller than an inclination angle of said second inclined surface of said at least one angled reflective portion.

6. A lighting device for a display device, as in claim 4, wherein:
said at least one angled reflective portion includes at least a first angled reflective portion and a second angled reflective portion;
said first angled reflective portion is arranged between said first linear light source and said second linear light source which are adjacently arranged at said first distance from each other, while said second angled reflective portion is arranged between a fourth linear light source and a fifth linear light source which are linear light sources of said plurality of linear light sources adjacently arranged at a third distance from each other;
said first angled reflective portion is positioned between said first linear light source and said second linear light source so that an apex of said first angled reflective portion is shifted from the center position between said first linear light source and said second linear light source to the side of said second linear light source by a first shift amount;
said second angled reflective portion is positioned between said fourth linear light source and said fifth linear light source so that an apex of said second angled reflective portion is shifted from a center position between said fourth linear light source and said fifth linear light source to a side of said fifth linear light source by a second shift amount; and
said first shift amount is set to be larger than said second shift amount, while said first distance is set to be larger than said third distance.

7. A lighting device for a display device, as in claim 6, wherein:
said first angled reflective portion includes said first inclined surface and said second inclined surface as light reflecting surfaces, so that said first inclined surface forms an inclination angle smaller than an inclination angle of said second inclined surface; and
said second angled reflective portion includes, as light reflecting surfaces, a fourth inclined surface facing said fourth linear light source and a fifth inclined surface facing said fifth linear light source, so that said fourth inclined surface forms an inclination angle smaller than an inclination angle of said fifth inclined surface.

8. A lighting device for a display device, as in claim 1, wherein:
said at least one angled reflective portion is positioned between said first linear light source and said second linear light source so that an apex of said at least one angled reflective portion is at a center position between said first linear light source and said second linear light source; and
said first inclined surface of said at least one angled reflective portion forms an inclination angle smaller than an inclination angle of said second inclined surface of said at least one angled reflective portion.

9. A lighting device for a display device, as in claim 1, wherein:
said at least one angled reflective portion includes at least a first angled reflective portion and a second angled reflective portion;
said first angled reflective portion is arranged between said first linear light source and said second linear light source which are adjacently arranged at said first distance from each other, while said second angled reflective portion is arranged between a fourth linear light source and a fifth linear light source which are linear light sources of said plurality of linear light sources adjacently arranged at a third distance from each other;
said first angled reflective portion includes said first inclined surface and said second inclined surface as light reflecting surfaces, while said second angled reflective portion includes, as light reflecting surfaces, a fourth inclined surface facing said fourth linear light source and a fifth inclined surface facing said fifth linear light source; and
said first inclined surface and said second inclined surface of said first angled reflective portion have larger areas than areas of said fourth inclined surface and said fifth inclined surface of said second angled reflective portion, while said first distance is set to be larger than said third distance.

10. A lighting device for a display device, as in claim 1, wherein:
said at least one angled reflective portion includes at least a first angled reflective portion and a second angled reflective portion;
said first angled reflective portion is arranged between said first linear light source and said second linear light source which are adjacently arranged at said first distance from each other, while said second angled reflective portion is arranged between a fourth linear light source and a fifth linear light source which are linear light sources of said plurality of linear light sources adjacently arranged at a third distance from each other; and
said first angled reflective portion has a larger height above said light reflecting plate than a height of said second angled reflective portion, while said first distance is set to be larger than said third distance.

11. A lighting device for a display device, as in claim 1, wherein said at least one angled reflective portion includes a plurality of angled reflective portions, which are each positioned between adjacently-arranged linear light sources of said plurality of linear light sources and are arranged parallel to one another.

12. A lighting device for a display device, as in claim 11, wherein said plurality of angled reflective portions have a geometrical configuration symmetric with respect to a center position of an array of said plurality of angled reflective portions.

13. A lighting device for a display device, as in claim 1, wherein said at least one angled reflective portion includes a plurality of angled reflective portions, which are arranged at all of respective areas between adjacently-arranged linear light sources of said plurality of linear light sources.

14. A lighting device for a display device, as in claim 1, wherein said plurality of linear light sources are arranged in a plane area parallel to a planar surface of said light reflecting plate.

15. A lighting device for a display device, as in claim 1, wherein:
a light diffuser plate is arranged on the light emitting side of said plurality of linear light sources; and
said plurality of linear light sources are arranged in a plane area parallel to a planar surface of said light diffuser plate.

16. A display device comprising:
a lighting device for a display device, as in claim 1; and
a display panel for providing display by use of light from said lighting device for a display device.

17. A display device as in claim 16, wherein said display panel is a liquid crystal panel that uses liquid crystal.

* * * * *